Dec. 23, 1947.  F. F. CARTER  2,433,199
CULTIVATOR SHIELD
Filed Aug. 4, 1945   2 Sheets-Sheet 1

INVENTOR
FRANK F. CARTER.
BY
ATTORNEY

Dec. 23, 1947.  F. F. CARTER  2,433,199
CULTIVATOR SHIELD
Filed Aug. 4, 1945  2 Sheets-Sheet 2
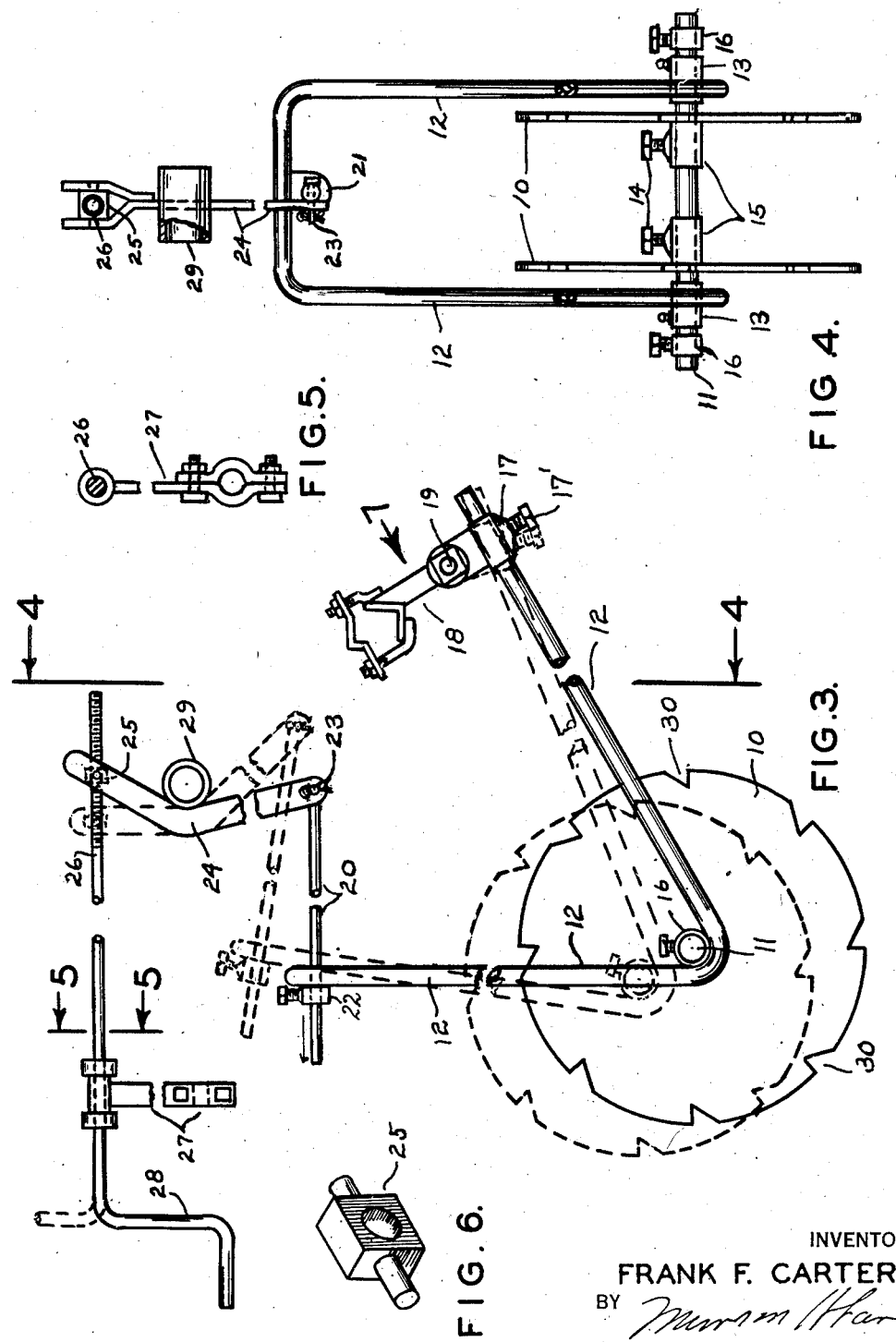
INVENTOR
FRANK F. CARTER.
BY
ATTORNEY Patented Dec. 23, 1947

2,433,199

UNITED STATES PATENT OFFICE 2,433,199

CULTIVATOR SHIELD

Frank F. Carter, Merkel, Tex.

Application August 4, 1945, Serial No. 608,909

4 Claims. (Cl. 97—188)

My invention relates to improvements in cultivator shields.

The primary object of the invention is to provide cultivator shields of rotary disk type which are readily adjustable while the cultivator is in motion from a tractor seat.

Another object of this invention is to provide cultivators with shields that can successfully be used in the cultivation of terraces.

Another object of this invention is to provide cultivator shields that will not hold weeds, trash or other obstacles which prevent their functioning.

Another object of this invention is to provide cultivators with shields having a rolling motion instead of the usual sliding motion, thus permitting greater maneuverability of the cultivator.

Other objects and advantages of this invention become more apparent from the following description and reference to the accompanying drawings in which—

Figure 3 is a side view of the shields showing their raised position in dash lines.

Figure 4 is a front view of the shields, parts being shown in section on line 4—4 of Figure 3.

Figure 5 is a sectional view on line 5—5 of Figure 3.

Figure 6 is an isometric perspective view of the vertical adjustment nut.

Figure 1:
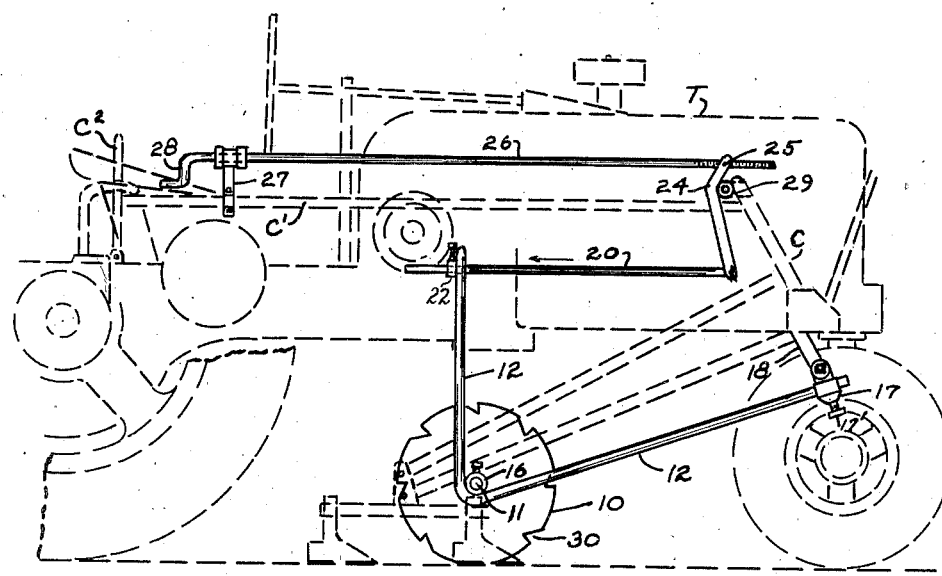
Figure 1 is a side view of cultivator shields attached to a cultivator, which is on a tractor ready for use.
Figure 2:
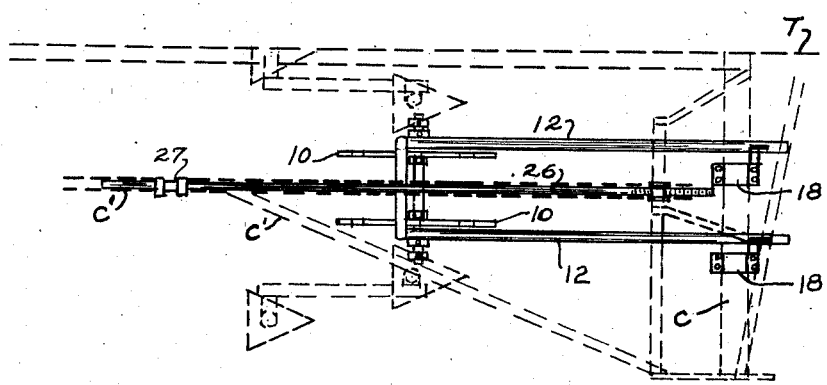
Figure 2 is a partial top view of Figure 1, showing the shields attached to one side of the cultivator.

Referring to the drawings, and more particularly to Figures 1 and 3, it will be seen that reference numeral 10 indicates rotatable disk-like shields that are supported by axle 11 on a V-shaped angular frame 12 by means of bearings 13. Shields 10 are adjustable laterally along axle 11 by set screw 14 on the shield hubs 15 (Figure 4). Axle 11 is kept in place by collars 16, as also shown in Figure 4.

Figure 7:
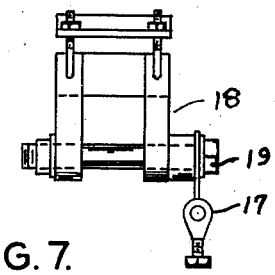
Figure 7 is a front end elevational view of the frame supporting clamp.

One arm of the V-shaped frame 12 is supported at the front by a clamp 17 that in turn is attached to clamp 18 carried by the cultivator frame by means of pivot bolt 19 (Figures 3 and 7), or other suitable means. The other arm of the V-shaped frame 12 is suspended from rod 20 passing through a lug 21 carried by the frame. Adjacent one end of rod 20 is adjustably secured a collar 22 whose use will be fully described hereinafter.

Passing through the front end of rod 20 is a pin 23 which thus attaches the said rod to the lower end of supporting lever 24 rotatably mounted on the frame of the cultivator. The upper end of lever 24 supports a vertical adjustment nut 25 through which passes the threaded end of an adjusting rod 26. The rear end of adjusting rod 26 is supported by a bearing carried by a clamping rod 27 that is attached to the outside lift pipe $C^1$ of the cultivator C. The rearmost end of rod 26 is formed into or attached to hand crank 28 by which means the cultivator shields are adapted to be vertically adjusted from the seat of tractor T while the said tractor is in motion.

The cultivator shields 10 are attached to the cultivator C by means of clamps 18 and a rotatable support 29 carried by the cultivator frame. Rotatable support 29 supports and is part of lever 24 as is clearly shown in Figures 3 and 4. Indirectly the cultivator shields are also supported by the bearing 27.

It is understood, of course, that a cultivator is made into two sections, right and left hand. Only the right hand section and the cultivator shields for the right hand section are shown in these drawings.

To operate these shields when the cultivator is in motion it is only necessary to turn the crank 28 which raises or lowers the frame 12 and said shields 10 as shown in dash lines on Figure 3; (dash lines show upward position of shields). To a certain extent the shields will also be raised or lowered whenever the cultivator outside pipe lever $C^2$ is moved. This can be readily understood on examination of Figure 1, since the bearing 27 is attached to outside lift pipe $C^1$ which is movable by outside lift pipe lever $C^2$; and any movement of this said lever will in turn transmit vertical motion to cultivator shields 10 by means of the adjusting rod 26, adjustment nut 25, supporting lever 24, pin 23, rod 20, frame support lug 21, frame 12, bearings 13, axle 11 to circular shields 10.

The extent of vertical adjustment of shields 10 and frame 12 may be regulated by the position of collar 22 along rod 20, which collar normally abuts against the lug 21, whereby through forward movement of rod 20 lifting motion may be transmitted to frame 12.

Horizontal adjustment of the frame 12 and of disks 10 is obtained by sliding the lower front ends of frame 12 forward or backward through adjusting clamps 17 and tightening adjusting screws $17^1$.

Lateral adjustment of the disks 10 is obtained by sliding clamps 18 laterally along the frame of the cultivator C and tightening them in the desired position. Lateral adjustment of shields 10 on axle 11 has previously been described.

It is to be noted that rotatable disk-like shields 10 contain peripheral indentations 30 in order to adapt the shields to take hold of the ground and thus turn instead of slide along the ground when in motion.

I claim:

1. In a cultivator shield attachment for cultivators, a unitary frame having an upwardly extending part and a forwardly extending part, a support for pivotally connecting the forwardly extending part for up and down movement to a cultivator, supporting means for pivotally connecting the upwardly extending part to the cultivator and imparting motion to said part to raise and lower the frame, said means including a lever, a rod pivoted to the lever and slidably engaging said upwardly extending part of the frame, an abutment on the rod for transmitting motion from the rod to the frame, and means for operating said lever and transmitting motion to said rod.

2. In a cultivator shield attachment for cultivators, a unitary frame of angular form and having an upwardly extending part and a forwardly extending part, each of said parts including spaced parallel arms, an axle supported by the arms of the forwardly extending part, rotary shield disks carried by the axle, means for pivotally connecting the forwardly extending part to a cultivator, supporting means for pivotally connecting the upwardly extending part to the cultivator and imparting motion to said part to raise and lower the frame, said means including a lever, a rod pivoted to the lever and slidably engaging said upwardly extending part of the frame, an abutment on the rod for transmitting motion from the rod to the frame, and means for operating said lever and transmitting motion to said rod.

3. In a device of the character described, the combination with a cultivator, of a plurality of rotatable disk-like shields, an axle for the shields, bearings to support the axle, an angular supporting frame carrying said bearings and including diverging arms, one of which is pivotally attached at its forward end to the cultivator; a lug suitably attached to the other arm of the frame, a rod passing through the said lug, an abutment on the rod engaging the lug, a lever rotatably supported by the cultivator and attached to the rod, by which the said supporting frame is attached to the cultivator for vertical adjustment, and means mounting the rod for travel on the cultivator.

4. In a device of the character described, the combination with a cultivator, of a plurality of rotatable disk-like shields, an axle for the shields, bearings to support the axle, a V-shaped supporting frame carrying the bearings, said frame having an upwardly extending part and a forwardly extending part, a lug on the upwardly extending part of the frame, a rod passing through the said lug, an adjustable collar on the rear end of the said rod, a rod attaching element pivotally connecting the front end of the said rod with the cultivator, a lever pivotally attached to the cultivator, a vertical adjusting mechanism on the cultivator attached to the said lever, and an adjusting rod in threaded engagement with said lever.

FRANK F. CARTER.

REFERENCES CITED

The following references are of record in the file of this patent:

UNITED STATES PATENTS

| Number | Name | Date |
|---|---|---|
| 531,167 | Drovedal | Dec. 18, 1894 |
| 975,326 | Byrd | Nov. 8, 1910 |
| 1,254,618 | Moon et al. | Jan. 22, 1918 |
| 1,760,336 | Benjamin | May 27, 1930 |
| 1,768,019 | Abeling et al. | June 24, 1930 |
| 1,870,910 | Hughes | Aug. 9, 1932 |
| 1,880,584 | Tibbitts | Oct. 4, 1932 |
| 2,175,512 | Adams | Oct. 10, 1939 |
| 2,220,338 | Koebel | Nov. 5, 1940 |